INVENTOR.
J. E. TRAINER
BY
W. A. Fraser

United States Patent Office 2,874,744
Patented Feb. 24, 1959

2,874,744

TUBELESS TIRES

James E. Trainer, Akron, Ohio, assignor to The Firestone Tire & Rubber Company, Akron, Ohio, a corporation of Ohio Application August 11, 1953, Serial No. 373,502

4 Claims. (Cl. 152—342)

This invention relates to tubeless tires and more particularly to tires having so-called safety diaphragms dividing the tires into separate compartments to provide protection against blow-outs.

It has heretofore been proposed to provide tubeless tires with safety diaphragms having an omega-shaped cross section. The central portion of such a diaphragm is substantially semi-circular in section and extends from one bead of the tire to the other in a manner to divide the tire into inner and outer compartments. As is well known, such a diaphragm will retain air within the inner compartment in the event a blow-out causes an explosive release of air from the outer compartment. The feature of the omega-type diaphragm is that the diaphragm is held in place by flaps which extend under the beads of the tire and then turn up radially outwardly between the flanges of the rim and the bead portions of the tire.

The prior art omega-type diaphragms are made of rubberized fabric with, in some cases, a slight amount of relatively soft gum rubber positioned at the outer flanges to provide a seal between the diaphragm and the tire and between the diaphragm and the rim. The main objection to such diaphragms is that the soft, flexible, pliable outer flanges are difficult to handle and the diaphragm cannot be readily mounted in the tire and on the rim.

The present invention avoids this difficulty by providing a relatively strong, stiff reinforcement at the outer flanges of such a diaphragm, permitting the diaphragm to be handled easily and with convenience. Moreover, with such a construction the flange naturally finds its position between the tire and the rim and makes correct mounting of the diaphragm virtually automatic.

Accordingly, the general object of the present invention is to provide an improved safety diaphragm for tubeless tires.

Another object is to provide a safety diaphragm for tubeless tires which can be readily mounted and which will remain securely in place.

Another object is to provide an improved omega-type diaphragm in which the outwardly extending flanges are of relatively rigid construction so as to provide ease of handling and to insure correct mounting.

These and other objects and advantages will be more fully apparent from the following description of several forms of the invention, reference being had to the accompanying drawings in which.

Figure 1:
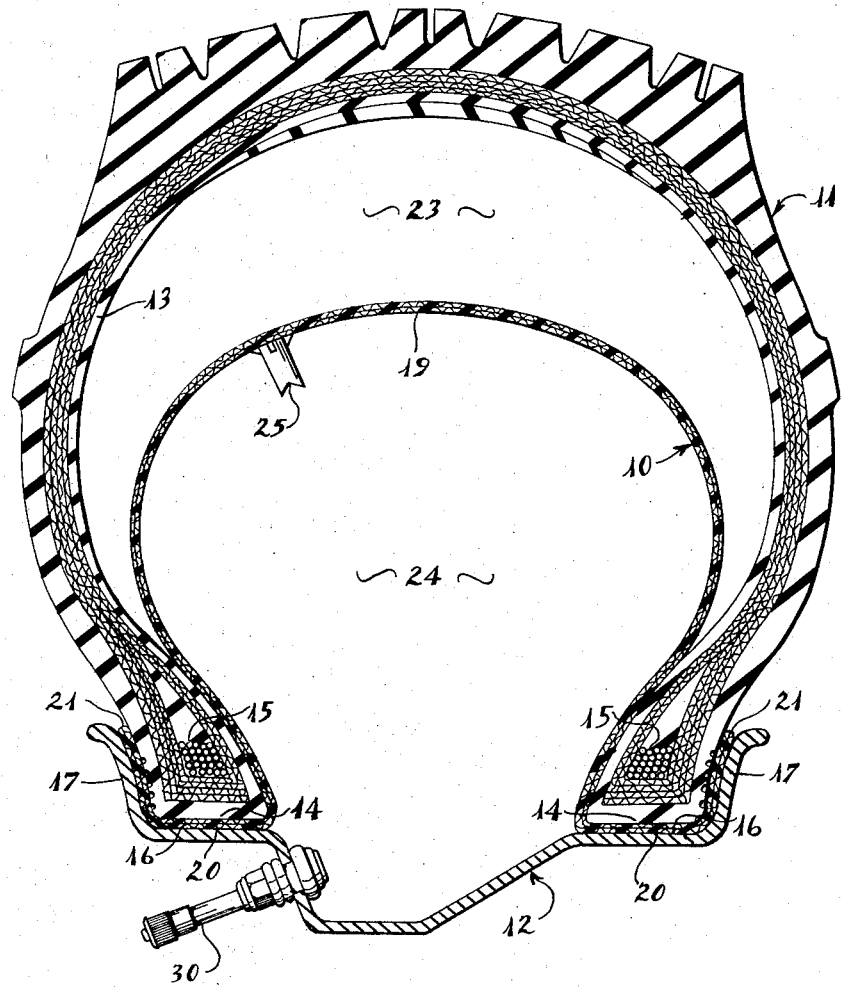
Figure 1 is a transverse sectional view of a tubeless tire together with a diaphragm embodying a preferred form of the present invention mounted on a conventional drop center rim.

A diaphragm 10 embodying the invention is illustrated in conjunction with a tubeless tire 11 which is more or less conventional in construction and which is shown mounted on a conventional drop-center rim 12. The construction of tire 11 will not be described in detail for it forms no part of the present invention. It is sufficient to note that the tire has an innerliner 13 of butyl rubber which has the function of retaining air within the tire, the butyl lining preferably extending to points 14 adjacent to and outside the toes of the tire beads 15. The beads 15 of the tire seat firmly on the tapered seats 16 of the rim and against the side flanges 17 of the rim. It will be appreciated that the internal air pressure within the tire forces the beads axially outwardly toward the flanges of the rim and that most of the sealing between the tire and the rim takes place in this area.

As mentioned above, the diaphragm 10 in section resembles the Greek letter "omega" in radial section and comprises a central semi-circular portion 19 and the flap portions 20 and 21 which extend under the beads of the tire and radially outwardly between the tire beads and the rim flanges, respectively. The central portion 19 of the diaphragm divides the tire into an outer compartment 23 and an inner compartment 24. In the event of a blow-out causing the sudden loss of air from the outer compartment 23, the diaphragm will retain air under pressure within the compartment 24 until the car can be brought safely to a stop. The diaphragm is made of two plies of bias-laid rubberized fabric molded to the desired shape in suitable dies. Preferably, the diaphragm is provided with a flutter valve 25 such as the valve described in the co-pending King and Coben application, Serial No. 194,129, filed November 4, 1950, now Patent No. 2,713,371, July 19, 1955, which comprises a tubular structure having ends which will be pinched together whenever the pressure in the inner chamber 24 greatly exceeds the pressure in chamber 23, as in case of a blow-out. Normally the valve will permit air to pass readily between the compartments when the tire is inflated.

As mentioned above, the flap portions 21 which extend radially outwardly between the tire beads and the rim flanges heretofore have been merely of rubberized fabric, at times, with an outer coating of soft gum rubber to provide a proper seal between the tire and the rim. I have found it desirable to provide a stock for the flap 21 which will cure to a greater strength and greater hardness than the rest of the rubber stock of the diaphragm. A hardness in the range of 40 to 80 Shore durometer is suitable. The flaps 21 should extend outwardly a sufficient distance to be visible beyond the flange 17 of the rim.

Figure 2:
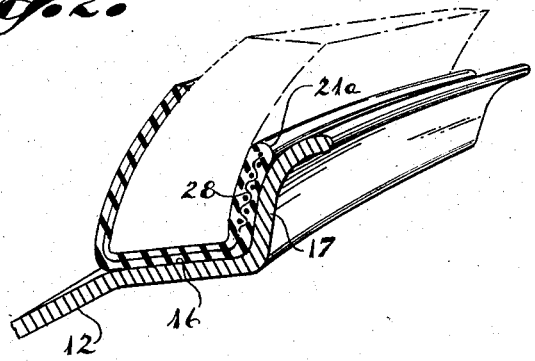
Figure 2 is a fragmentary view of a diaphragm showing one of the flap portions embodying another form of the invention.

As an alternative construction, an insert, such as a strip of heavy plastic woven fabric 28 may be imbedded in the outer flap which is indicated at 21a in Figure 2. The fibers of the fabric should be extruded monofilaments of nylon, rayon and the like, and should have considerable stiffness and strength. In some cases a metal wire screen may be used for an insert.

Figure 3:
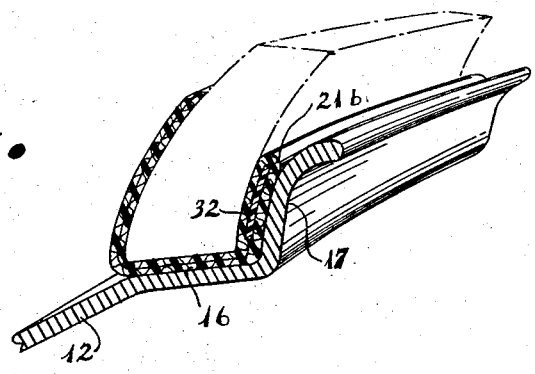
Figure 3 is similar to Figure 2 showing yet another form of the invention.

Yet another insert is shown in Figure 3. This takes the form of a strip 32 of plastic sheet imbedded in flap 21b. The strip may, if desired, be perforated to anchor firmly in the flap.

Figure 4:
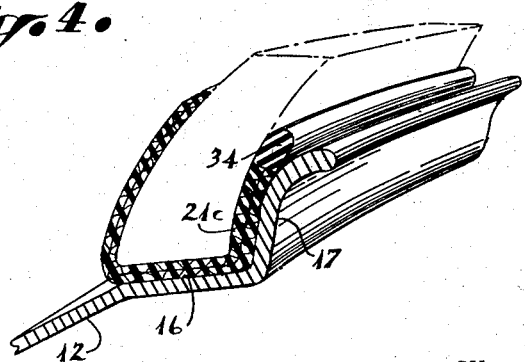
Figure 4 is a fragmentary view of a diaphragm similar to Figures 2 and 3 showing still another embodiment of the invention.

Figure 4 shows yet another form of the invention. In this embodiment the end 34 of flap 21c is compounded of a harder curing stock leaving the inner portion of flap 21c softer than the tip. In this form the hard tip 34 may extend completely beyond the side flange of the rim. The tip 34 can likewise be in the range of 40 to 80 Shore durometer, but would obviously have a hardness in the upper region of such hardness range while the rest of the flap would have a hardness in the lower region of the same hardness range.

In all of the above cases the flap 21 should be relatively stiff and strong so that it may be readily grasped when the diaphragm is mounted on the tire and when the tire is mounted on the rim. If the diaphragm is molded so that the flap portions 20 lying underneath the beads are relatively thin, say 0.020 in., and so that the outer flaps 21 are made relatively thick, say in excess of 0.040 in., the diaphragm can be readily handled and mounted without difficulty. These dimensions, while preferred, are not critical.

In mounting the diaphragm and tire, the diaphragm is fitted within the tire with the flaps 20 and 21 fitting snugly around the tire beads. The tire can then be mounted in the usual fashion by the use of conventional mounting tools. The flaps 20 and 21 do not interfere with the use of such tools. The tire is then inflated in the ordinary way by means of inflation valve 30.

While a preferred form of the invention has been described, various modifications and changes will be apparent to those skilled in the art without departing from the spirit and scope of the invention, the essential features of which are summarized in the appended claims.

I claim:

1. In combination, a tubeless tire, a rim carrying said tire, and a safety diaphragm extending from bead to bead of said tire and dividing the chamber defined by said tire and said rim into inner and outer compartments, said diaphragm comprising a substantially channel-shaped body portion of rubberized fabric terminating in generally axially outwardly extending portions interposed between the axial surfaces of said tire beads and the bead seats of said rim, and generally radially outwardly extending flap portions merging integrally with said axial portions and interposed between the radial outer surfaces of said tire beads and the side flanges of said rim, said radial flap portions each comprising a monofilamentary sheet embedded in vulcanized rubber and extending from a point adjacent the heel of said bead substantially to the radially outermost edge of said radial portions, said vulcanized rubber having a hardness in the range of 60 to 80 Shore durometer to render said flap portions less flexible than the remainder of said diaphragm.

2. The combination of claim 1, in which said sheet comprises nylon monofilaments.

3. The combination of claim 1, in which said sheet comprises wire monofilaments.

4. The combination of claim 1, in which said sheet comprises woven monofilamentary material.

References Cited in the file of this patent

UNITED STATES PATENTS

| | | |
|---|---|---|
| 2,273,200 | Hoff | Feb. 17, 1942 |
| 2,410,209 | Godsey | Oct. 29, 1946 |
| 2,526,997 | Davis | Oct. 24, 1950 |
| 2,665,732 | Slezak | Jan. 12, 1954 |
| 2,698,042 | Perkins | Dec. 28, 1954 |
| 2,756,800 | Riggs | July 31, 1956 |

FOREIGN PATENTS

| | | |
|---|---|---|
| 512,945 | Belgium | Aug. 14, 1952 |

OTHER REFERENCES

Vanderbilt Rubber Handbook, ninth edition, 1948, pages 156 and 157.